United States Patent Office 2,958,190
Patented Nov. 1, 1960

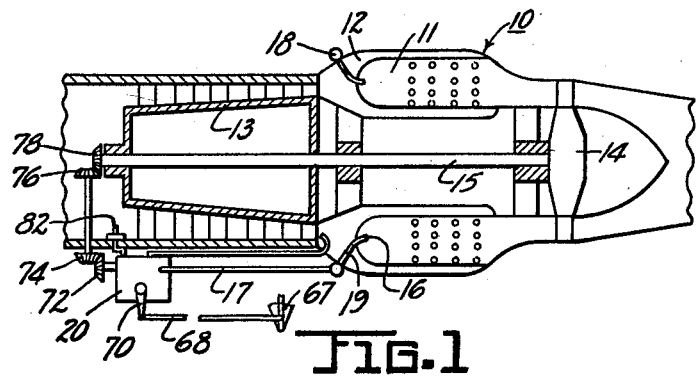
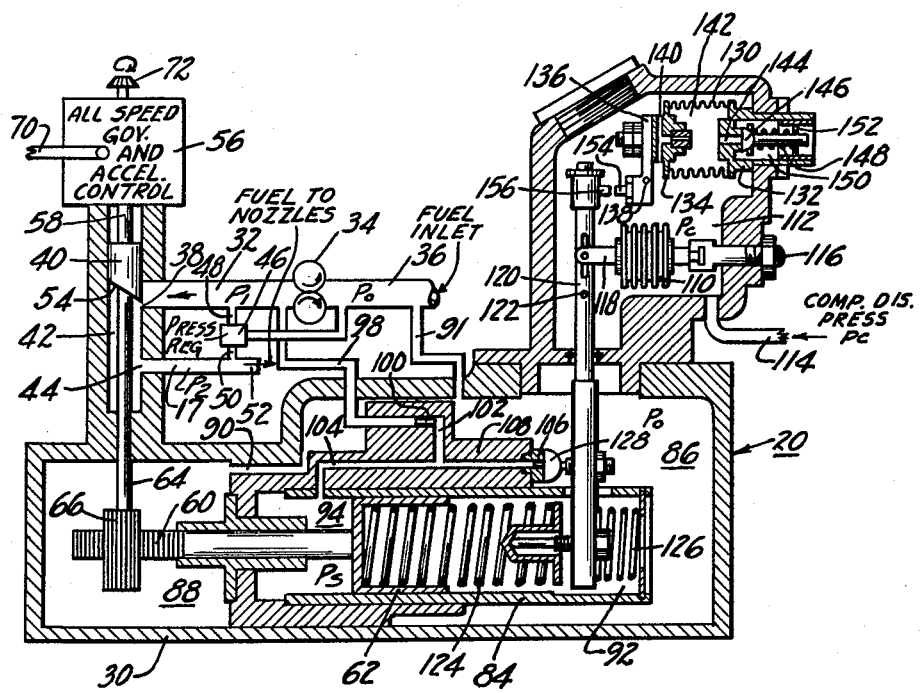

2,958,190

COMPRESSOR PRESSURE LIMITER FOR GAS TURBINE ENGINES

Francis R. Rogers, South Bend, Ind., assignor to The Bendix Corporation, a corporation of Delaware Filed Apr. 13, 1955, Ser. No. 501,140

8 Claims. (Cl. 60—39.28)

This invention relates to a fuel feed and power control device for gas turbine engines and more particularly to such a device which utilizes means for maintaining compressor discharge pressure or compressor rise under a predetermined maximum value.

It is a primary object of this invention to control fuel flow to engines of the type specified in such a manner that excessive, or possibly dangerous compressor pressures cannot be attained.

It is a further object of this invention to provide relatively simple means which is adapted to maintain compressor discharge pressure within a safe range during engine operation.

The above and other objects and features of this invention will become apparent from the following description of the device taken in conjunction with the accompanying drawings, wherein:

Figure 1 is a sectional view of a turbo-jet engine equipped with a fuel feed and power control device in accordance with the invention; and Figure 2 is a schematic sectional view of a portion of a fuel feed and power control device used on the engine of Figure 1.

Referring now to Figure 1, a gas turbine engine is generally indicated at 10 and includes a series of annularly disposed combustion chambers 11 mounted in a casing having a header or air intake section 12, and a compressor 13, shown as of the axial flow type, which is driven by means of a turbine 14 through a shaft 15. Each of the combustion chambers is provided with a burner nozzle 16 to which metered fuel is supplied under pressure by way of a conduit 17, fuel manifold 18 and individual fuel lines 19. The conduit 17 receives metered fuel from the fuel control device generally indicated at 20 in Figure 1 and partially shown in sectional schematic in Figure 2, which will now be described.

Mechanism included in the fuel control device 20 is enclosed within a housing 30 to which pressurized fuel is supplied through a conduit 32 at a pressure $P_1$ by a pump 34, which is connected to a source of fuel, not shown, by a conduit 36. From conduit 32, fuel flows to the nozzles 16 by way of a metering orifice 38, the area of which is controlled by a main metering valve 40, a chamber 42, a discharge port 44, the discharge conduit 17 at $P_2$ pressure, and fuel manifold 18. A pressure regulator valve, shown in block diagram at 46, is connected to conduits 32, 17 and 36 by means of passages 48, 50 and 52, respectively, and is adapted to maintain a constant pressure drop across metering orifice 38 under all conditions of engine operation and at all positions of valve 40. A pressure regulator valve which is suitable for this purpose is disclosed and claimed in copending application Serial No. 248,402, now abandoned, filed September 26, 1951 in the name of Harry C. Zeisloft (common assignee).

Metering valve 40 is axially and rotatably actuatable within chamber 42 to control the metering area of orifice 38, and is formed with a sloping area control face 54, said valve being connected to an all-speed governor and acceleration control unit 56 by a valve stem 58, and being connected to a reciprocable rack 60, which is positioned by a servo motor piston 62, by a valve stem 64 and a spline member 66.

Unit 56 may include engine governing and acceleration control mechanism, such as is shown in copending application Serial No. 499,432, filed April 5, 1955 in the names of Howard J. Williams et al. (common assignee), for controlling the axial position of metering valve 40; the mechanism is connected to a pilot's control lever 67 by a link 68 and lever 70, to the engine drive shaft 15 by bevel gears 72, 74 and 76, 78, and to a compressor inlet temperature responsive element 82.

The angular position of valve 40, and therefore the metering area of orifice 38, is varied with variations in the position of servo position 62 which is positionally controlled within a tube or cylinder 84 by mechanism to be described. Cylinder 84, and rack and spline 60 and 66 are disposed within housing cavities 86 and 88, respectively, which are interconnected by a passage 90 and connected to pump inlet conduit 36 by a conduit 91. Piston 62 forms a chamber 92 at the right end thereof which opens into chamber 86 through the end of cylinder 84 and a servo pressure chamber 94 at the opposite end thereof which is connected to pump discharge conduit 32 by a conduit 98, a restriction 100 and passages 102 and 104, and which is connected to chamber 86 by the conduit 104 and a calibrated restriction 106. The restriction 106 is held in a fixed position by a portion 108 of housing 30.

An evacuated bellows 110 is mounted in an air pressure chamber 112 formed in the upper part of housing 30, said chamber being connected to presure $P_c$ at the discharge side of the compressor 13 by a conduit 114. The bellows is anchored at the one end thereof to a member 116 and is expansible at the opposite end thereof to control the angular position of metering valve 40 as a function of the pressure in chamber 112. The bellows is operatively connected to valve 40 by means of a link 118, a lever 120 which is fulcrumed at 122, spring loaded at the lower end thereof by a piston spring 124 and a return spring 126 and connected to a half-ball servo valve 128 at the mid-section thereof, the power piston 62, and the rack and pinion 60 and 66. The springs 124 and 126 are amounted in opposing relation in the cylinder 84; piston spring 124 urges the piston 62 and the servo valve 128 in a valve closing direction, i.e., in a direction which tends to result in a rotation of metering valve 40 to a position such as is shown, in which the metering area 38 is restricted a maximum amount at a given axial position of valve 40, and return spring 126 urges servo valve 128 in a valve opening direction. The valve closing force which is exerted on the piston by spring 124 is opposed by a controlled servo pressure ($P_s$) in chamber 94, which pressure may be varied between pressure $P_1$ upstream of fixed restriction 100 and pressure $P_0$ downstream of restriction 106, depending on the position of servo valve 128 relative to said restriction.

The position of servo valve 128 relative to restriction 106 is fixed whenever the force-moment produced by compressor discharge pressure acting on bellows 110 about fulcrum 122 is equal to the resultant force moment produced by springs 124 and 126 about said fulcrum, at which time the servo valve controls that pressure in chamber 94 which effects a balance with said springs, thereby fixing the angular position of metering valve 40. If compressor discharge pressure should increase for any reason, as with a decrease in the altitude of operation, it is apparent that the force on bellows 110 will decrease in direct proportion thereto, thereby tending to rotate lever 120 in a clockwise direction about the fulcrum to decrease the effective area of restriction 106 which causes an increase in pressure in chamber 94; this causes piston 62 to move rightwardly in a fuel flow increasing direction so as to continuously maintain a moment force balance between the springs and the bellows. It will be apparent that the linear position of piston 62, and the angular position of valve 40 are controlled so as to be continuously proportional to existing compressor discharge pressure.

The function of the return spring 126 is to insure the generation of a sufficiently high servo pressure in chamber 94 at very low compressor discharge pressures so that accurate control of the rotational position of valve 40 will result irrespective of the compressor pressure level.

The servo mechanism herein utilized for controlling the positions of piston 62 and valve 40 may be termed a force type servo; i.e. the force imposed on bellows 110 is directly converted into a travel or position of piston 62 with extremely small movement of the servo valve 128 and lever 120.

A maximum compressor discharge pressure limiter bellows 130 is anchored in chamber 112 on a housing piece 132 and is movably connected by an end plate 134 to a lever 136 which is fulcrumped at 138, said member containing a restricted passage 140 which connects chamber 112 with a chamber 142 interior the bellows 130. Anchor member 132 contains a passage 144 which is normally closed by a half-ball servo valve 146, said servo valve being urged towards seated position on said member by a spring 148 mounted in a chamber 150 which is vented to the atmosphere or to compressor inlet pressure, as desired, through ports 152.

Under all conditions of engine operation, excepting an over-pressure condition, servo valve 146 is maintained in seated position on member 132 by spring 148, and the pressure in bellows chamber 142 is equal to the pressure in chamber 112. It is therefore apparent that the spring force of bellows 130 tends to rotate lever 136 counter-clockwise, thereby maintaining a nib 154 on lever 136 out of contact with an adjacent nib 156 on the upper end of lever 120. The spring 148 is preloaded to maintain servo valve 146 in a closed position up to a predetermined maximum allowable compressor discharge pressure.

Operation

The various parts of the applicant's control 20 are illustrated as they would appear if the engine 10 were operating in a low power steady state condition, such as during idling operation. The all-speed governor portion of unit 56 is controlling the axial position of metering valve 40 such that an amount of fuel is metered at orifice 38 which will maintain an idle condition of operation at any given angular position of said valve.

To accelerate the engine the pilot rotates lever 67 so as to reset the governor and actuate valve 40 upwardly, which initiates an increase in fuel flow. As the engine begins to accelerate, pressure $P_c$ increases and, as applied to bellows 110, tends to rotate lever 120 clockwise and move servo valve 128 toward restriction 106 to decrease the effective flow area thereof; such movement of valve 128 results in an increasing servo pressure $P_s$ in chamber 94 which actuates piston 62 to increase the loading of piston spring 124 and rotate valve 40 in a direction to increase the opening of metering orifice 38. The piston travel continues during acceleration of the engine until the piston spring 124 is compressed to exert a moment force about fulcrum 122 which balances the new moment force of $P_c$ pressure acting on the evacuated bellows plus the moment force of balance spring 126. Such a balanced condition would be attained at the new selected condition of engine operation.

If, during an acceleration of the engine, the predetermined maximum compressor discharge pressure is exceeded, the resulting force acting on the face of servo valve 146 overcomes spring 148 and vents bellows chamber 142 to the atmosphere through passage 144, chamber 150 and ports 152. An air pressure differential is thereby created across the movable end of bellows 130 and the restricted passage 140 which tends to actuate the lever 136 in a clockwise direction and causes contact between nibs 154 and 156, thereby imposing a moment force on lever 120 which varies in proportion to the degree of over-pressure, and which acts counter to the moment force imposed on said lever by bellows 110. It is therefore apparent that an over-pressure condition at the discharge of the compressor results in an immediate unbalance of moment forces about fulcrum 122 in a direction which causes leftward or valve closing movement of power piston 62. Such action results in reducing fuel flow to the engine which causes a reduction in compressor discharge pressure, thereby eliminating the possibility of damage to the engine because of an over-pressure condition therein. Upon a decrease in compressor discharge pressure to the predetermined maximum allowable value thereof, valve 146 again closes and the limiter bellows 130 returns lever 136 to the position shown, whereupon full control of the angular position of metering valve 40 as a function of existing $P_c$ pressure is returned to the bellows 110 and piston 62.

Although only one specific embodiment of my invention has been included in the description it will be understood that variations may be made without departing from the scope of the invention.

I claim:

1. In a fuel feed and power control system for a gas turbine engine having a burner and an air compressor, a conduit for delivering fuel to the burner, valve means for controlling the flow of fuel through said conduit, means responsive to the discharge air pressure of said compressor operatively connected to said valve means for controlling the flow regulating position thereof, said pressure responsive means having a force output which varies with variations in said compressor discharge pressure, and means responsive to a predetermined value of said pressure and adapted to be connected to said pressure responsive means following the generation of said predetermined pressure by the engine, said last named means having a force output which acts in opposition to the force output of said pressure responsive means to thereby establish a resultant force output which is limited in value in accordance with said predetermined pressure.

2. In a fuel feed and power control system for a gas turbine engine having a burner and a compressor, a conduit for delivering fuel to the burner, valve means for controlling the flow of fuel through said conduit, compressor pressure responsive means operatively connected to said valve means for controlling the flow regulating position thereof, said operative connection being subjected to a first force by said pressure responsive means which varies as a function of a compressor pressure, and means responsive to a predetermined value of a compressor pressure for subjecting said operative connection to a force which tends to counteract said first force and limit said first force to a predetermined maximum value.

3. In a fuel feed and power control system for a gas turbine engine having a burner and a compressor, a conduit for delivering fuel to the burner, valve means for controlling the flow of fuel through said conduit, compressor pressure responsive means operatively connected to said valve means for controlling the flow regulating position thereof, said operative connection being subjected to a first force by said pressure responsive means which varies as a function of a compressor pressure, and means responsive to a predetermined value of a compressor pressure for subjecting said operative connection to a force which tends to counteract said first force and limit said first force to a predetermined maximum value, said last mentioned pressure responsive means comprising a movable wall means normally subjected to the same compressor pressure on both sides thereof, and a normally closed passage means for reducing the pressure on one side thereof following the generation of said predetermined pressure value by the compressor.

4. In a fuel feed and power control system for a gas turbine engine having a burner and a compressor, a conduit for delivering fuel to the burner, valve means for controlling the flow of fuel through said conduit, compressor pressure responsive means operatively connected to said valve means for controlling the flow regulating position thereof, said operative connection being subjected to a first force by said pressure responsive means which varies as a function of a compressor pressure, and means responsive to a predetermined value of a compressor pressure for subjecting said operative connection to a force which tends to counteract said first force and limit said first force to a predetermined maximum value, said first and second named compressor pressure responsive means being mounted in a compressor pressure chamber, said second named pressure responsive means comprising a bellows, a bellows chamber and a normally closed passage means for connecting said bellows chamber to a low pressure source at a predetermined high value of said compressor pressure.

5. In a fuel feed and power control system for a gas turbine engine having a burner and a compressor, a conduit for delivering fuel to the burner, valve means for controlling the flow of fuel through said conduit, an air pressure chamber, a first bellows in said chamber operatively connected to said valve means for controlling the flow regulating position thereof, a second bellows in said chamber normally not operatively connected to said valve means, a conduit connecting said chamber with a source of engine pressure, a restricted passage connecting said chamber with the interior of said second bellows, and a normally closed passage adapted to connect the interior of said second bellows to a low pressure source whenever said engine pressure exceeds a predetermined maximum value, said second bellows becoming operatively connected to said valve means for limiting the flow of fuel to the burner at engine pressures above said predetermined maximum value.

6. A fuel feed and power control system for a gas turbine engine as claimed in claim 5 wherein a mechanism common to both said first and second bellows operatively connects both of said bellows to said valve means, said first bellows exerting a force on said mechanism which varies with variations in said engine pressure and said second bellows exerting a counteracting force on said mechanism at engine pressures above said predetermined maximum value.

7. In a fuel feed and power control system for a gas turbine engine having a burner and a compressor, a conduit for delivering fuel to the burner, valve means for controlling the flow of fuel through said conduit, a first means responsive to an engine pressure which varies with engine power output operatively connected to said valve means for controlling the flow regulating position thereof as a function of said pressure, said operative connection including motor means, valvular means controlling said motor means and lever means interconnecting said engine pressure responsive means, said motor means and said valvular means in such a manner that an increase in said engine pressure increases the moment of force of the pressure responsive means on said lever means to cause said motor means to actuate said valve means in a fuel flow increasing direction, and a second means responsive to a predetermined value of said engine pressure for imposing a force moment on said lever means in opposition to the force moment imposed thereon by said first pressure responsive means for limiting maximum fuel flow to the burner at said predetermined value of said engine pressure.

8. A control system for a gas turbine engine as claimed in claim 7 wherein said first pressure responsive means comprises an evacuated bellows and said second pressure responsive means includes a bellows adapted to be internally vented to said engine pressure at engine pressure values below said predetermined value thereof and to be internally vented to a relatively low pressure source at engine pressure values above said predetermined value thereof.

References Cited in the file of this patent

UNITED STATES PATENTS

| | | |
|---|---|---|
| 2,670,599 | Davies et al. | Mar. 2, 1954 |
| 2,694,290 | Best | Nov. 16, 1954 |
| 2,759,549 | Best | Aug. 21, 1956 |
| 2,796,733 | Pearl et al. | June 25, 1957 |